United States Patent Office 3,799,983
Patented Mar. 26, 1974

3,799,983
CATALYTIC HYDROGENATION PROCESS
Hubert Corr, Wilhelm Friedrichsen, and Guenther Poehler, Ludwigshafen, Germany, assignors to Badische Anilin- & Soda-Fabrik Aktiengesellschaft, Ludwigshafen am Rhine, Germany
No Drawing. Filed Apr. 24, 1970, Ser. No. 31,796
Claims priority, application Germany, Apr. 26, 1969, P 19 21 467.6
Int. Cl. C07c 87/34
U.S. Cl. 260—563 D                4 Claims

ABSTRACT OF THE DISCLOSURE

Catalytic hydrogenation process carried out at elevated temperatures and pressures in the presence of supported catalysts comprising elements in Group 8, 7b and/or 6b of the Periodic Table, the material to be hydrogenated being in substantially liquid phase. The catalysts are prepared by spraying shaped carrier material with a solution or suspension containing one or more metals and/or compounds of said elements and optionally basifying alkali metal or alkaline earth metal compounds and optionally a bonding agent at temperatures ranging from 150° to 500° C. followed, if desired, by heating to a temperature of from 300° to 1,000° C., preferably from 300° to 650° C.

---

This invention relates to a catalytic hydrogenation process using as catalysts supported elements in Groups 8, 7b and/or 6b of the Periodic Table.

It is known, for example from U.S. Pat. No. 2,606,927, that catalytic hydrogenation may be carried out using cobalt or nickel catalysts. The yields obtainable by the known processes are not satisfactory, however, and/or the catalysts used have an inadequate life.

It is an object of the present invention to provide a catalytic hydrogenation process in which the catalysts show better adhesion of the catalytically active ingredients to the support than in previously known processes.

Another object of the invention is to provide a process which is superior to previously known processes in that the life of the catalyst is long and the catalyst shows constant, high activity while providing good yields.

A further object of the invention is to provide a process which, in particular, is suitable for continuous operation.

In accordance with this invention these and other objects and advantages are achieved in a catalytic hydrogenation process carried out at elevated temperatures and pressures in the presence of supported elements in Group 8, 7b and/or 6b of the Periodic Table acting as catalysts, the material to be hydrogenated being in substantially liquid phase, wherein catalysts comprising elements in Groups 8, 7b and/or 6b of the Periodic Table on supports are used, which catalysts have been made by spraying a shaped carrier material with a solution or suspension containing one or more metals and/or compounds of elements contained in Groups 8, 7b and/or 6b of the Periodic Table and, optionally, basifying alkali metal compounds or alkaline earth metal compounds and, optionally, a bonding agent, at temperatures ranging from 150° to 500° C. followed, if desired, by heating to a temperature of from 300° to 1,000° C., preferably from 300° to 650° C.

The process is advantageously used for the hydrogenation of aromatic hydrocarbons to cycloaliphatic hydrocarbons, of nitroaromatic hydrocarbons to cycloaliphatic amines, of ketones to secondary alcohols, of acids to alcohols, of saturated or unsaturated aliphatic aldehydes to saturated alcohols, of nitrile compounds to amines or of compounds containing one or more, preferably one or two benzene rings to the corresponding cyclohexyl compounds. Suitable starting materials are, for example, benzene, toluene, xylene, cyclohexanone, cyclo-octanone, aniline, toluidine, phenol, methylaniline, nitrobenzene, aminoacetonitrile, aminopropionitrile, ethoxy propionitrile, N-stearyl aminopropionitrile, dicyano ethylbutanediol ether, dihydroxy diphenylalkanes such as 4,4'-dihydroxy diphenylmethane or 4,4'-dihydroxy diphenylpropane, and, in particular, diamino diphenylalkanes or ethers such as 4,4'-diamino-2,2'-dipropyl diphenylmethane,
N,N'-dibutyl-4,4'-diamino diphenylmethane,
4,4'-diamino diphenylpropane-1,3,
4,4'-diamino diphenylbutane-1,4,
2,2'-diamino diphenylmethane,
4,4'-diamino-2,2'-dichloro diphenylpropane-2,2,
2,2'-diamino-5,5'-dimethoxy diphenylmethane,
N,N'-dimethyl-4,4'-diamino diphenyl ether and, in particular, 4,4'-diamino diphenylmethane, 4,4'-diamino - 2,2' - dimethyl diphenylmethane and 4,4'-diamino diphenylpropane-2,2. The process is particularly suitable for the production of diamino dicyclohexylalkanes or ethers from the diamino diphenylalkanes or ethers.

Hydrogenation may be effected in the absence of solvents, but solvents which are inert under the conditions of reaction may be included if desired, for example saturated aliphatic hydrocarbons such as cyclohexane, decahydronaphthalene, or cyclic ethers such as tetrahydrofuran or dioxane. The catalytic hydrogenation is preferably carried out at temperatures ranging from 100° to 400° C. and in particular from 150° to 300° C. Conveniently, pressures of from 20 to 700 atmospheres and in particular from 50 to 400 atmospheres are used.

The catalysts used are those comprising one or more elements of Groups 8, 7b and/or 6b of the Periodic Table on supports. The Periodic Table referred to is that given in the Handbook of Chemistry and Physics, 49th edition, Chemical Rubber Publishing Co., Cleveland, Ohio. Suitable supports are, for example, natural or synthetic silicates, zeolites, alumina, kieselguhr, pumice, porcelain, quartz, silicon carbide, zinc oxide, magnesium oxide and titanium oxide. The support is shaped and may for example be in the form of cylinders or pellets. We prefer the support to be in the form of spheres, however, which spheres conveniently have a diameter of from 2 to 30 mm. and preferably from 2 to 12 mm. Preferred catalysts contain from 3 to 40% by weight, in particular from 10 to 40% by weight, of one or more elements in Groups 8, 7b and/or 6b of the Periodic Table, calculated as metal and based on the sum of support and metal. Suitable elements of the Groups 8, 7b and/or 6b of the Periodic Table are, for example, molybdenum, tungsten, chromium, platinum, palladium, ruthenium, manganese and, in particular, cobalt and nickel. The shaped support may be treated, before spraying, with fluorine compounds, such as hydrofluoric acid or ammonium fluoride. This improves the adhesion of the composition containing the catalytically active metals. It may be beneficial for the catalyst to contain additionally one or more basifying alkali metal or alkaline earth metal compounds, which compounds are preferably applied in quantities such that their concentration is from 0.1 to 8% by weight of the sum of the support and metal compound weights, calculated as alkali metal or alkaline earth metal oxide.

The method of preparing the supported catalyst is an important feature of the invention. The catalysts are made by spraying the shaped support at temperatures ranging from 150° to 500° and preferably from 250° to 500° C. and most preferably from 300° to 400° C. with a solution or suspension containing one or more elements in Groups 8, 7b and/or 6b of the Periodic Table as the metals themselves or, preferably, as compounds and also containing, if desired, basifying alkali metal compounds or alkaline earth metal compounds. The treated catalyst material is normally sufficiently dry at the end of the spraying operation for it to be immediately reduced without any intermediate drying or, if it is desired to produce metal oxides, to be heated to muffle furnace temperature. However, a separate drying process may be inserted after spraying if desired. In order to convert metal compounds to the corresponding oxides, the resulting catalyst is generally heated at temperatures ranging from 300° to 1,000° C. and preferably from 300° to 650° C., the muffle temperature normally being higher than the spray temperatures. The suspensions or solutions are made preferably using water as the continuous phase or solvent.

Suitable basifying alkali metal compounds or alkaline earth metal compounds are, for example, sodium carbonate, potassium carbonate, sodium hydroxide, potassium hydroxide, tertiary sodium phosphate, tertiary potassium phosphate, calcium hydroxide and barium hydroxide. We prefer to use the carbonates of alkali metals, particularly of sodium and potassium.

Where it is desired to use the elements in Groups 8, 7b, and/or 6b of the Periodic Table in the form of the metals themselves, they are used in a finely divided state. However, we prefer to use these elements in the form of compounds, in particular salts. In the salts, the type of counter-ion to the ion containing the active metal is not critical. Suitable compounds are, for example, the oxides, hydroxides, carbonates, halides, nitrates, formates, oxalates, acetates, phosphates and sulfides.

It may be advantageous to add a bonding agent to the solution or suspension containing the catalytically active elements and/or compounds. Suitable bonding agents are, for example, glyoxal, saccharides, polysaccharides such as starch or its degradation products, polymers such as rubbers, synthetic rubbers, polybutadiene, polyamides or resins such as polyester resins, epoxy resins or rosin. We have found glyoxal and saccharides to be particularly useful bonding agents. Conveniently, the bonding agent is added at a concentration of from 2 to 12% and preferably from 4 to 9% by weight of the supported catalyst plus support. The solution or suspension used for spraying may also contain thickening agents such as alginates or polyacrylates. In addition to the elements in Groups 8, 7b and/or 6b of the Periodic Table the catalysts may also contain preferably from 0.01 to 10% by weight, based on the metals contained in the catalyst and support, of activators such as thorium, copper, titanium or vanadium. The wettability of the shaped support may be increased by adding water-miscible organic solvents such as lower aliphatic alcohols, ketones or amides to the solution or suspension to be sprayed on to the support. Suitable solvents are, for example, ethanol, isopropanol, acetone, formamide, and dimethylformamide. There may also be added to the solution or suspension solid amides, such as urea or thio-urea or ammonium salts with weak organic acids such as ammonium thiocyanate, to increase the wettability of the carrier materials at room temperature. The substances used to increase the wettability are generally added in quantities ranging from 5 to 60% and in particular from 10 to 45% by weight of the weight of the solution or suspension.

The supported catalyst may be made, for example, by spraying the support with the solution or suspension in a rotating coating drum at the temperatures specified. At the conclusion of the spraying operation the sprayed supports are either immediately reduced or are heated to temperatures between 300° and 1,000° C. and preferably between 300° and 650° C. in order to convert the metal compounds to the oxides. The catalyst may be reduced before use with hydrogen, for example at atmospheric pressure and a temperature of from 200° to 400° C.

For the hydrogenation of diamino diarylalkanes or diamino diaryl ethers it is convenient to use catalysts which have been heated after spraying to the said temperatures of from 300° to 1,000° C.

The catalytic hydrogenation is effected, for example, by passing the feedstock to be hydrogenated in substantially liquid phase and if necessary together with a suitable solvent, and hydrogen down through a vertical high-pressure tube at the specified pressure and temperature conditions over the catalyst made and formulated as stated above and contained in the tube as a fixed bed. A shaft furnace or tubular reactor may be used for this purpose. The hydrogen may be passed counter-currently to the feedstock if desired. The product of the reaction is then cooled under pressure, separated from the hydrogen and pressure-released. The hydrogen and, if desired, a portion of the reaction product are conveniently recycled. The reaction products may be isolated from the discharged material, for example by fractional distillation.

Some of the substances obtained by the process of the invention are valuable starting materials for the manufacture of high molecular compounds such as polyamides, and others are suitable for use as solvents.

EXAMPLE 1

1,250 g. of spheres of molten alumina having a diameter of 6 mm. are heated in a coating drum at 300° C. and sprayed at this temperature with a composition comprising 419 g. of cobalt oxide (CoO), 44 g. of sodium carbonate, 85 g. of glyoxal and 1,000 g. of water. The sprayed spheres are then heated at 500° C. for 3 hours. The catalyst contains 24.7% of cobaltous oxide and 1.52% of sodium oxide, by weight.

A tube of 1.5 m. in length and 30 mm. in diameter is filled with the resulting catalyst. At the top end of the tube 100 g. of molten 4,4'-diamino-3,3'-dimethylphenylmethane together with 2,000 l. of hydrogen (as measured at S.T.P.) are passed into the tube per hour at a temperature of from 220° to 255° C. and a pressure of from 250 to 300 atmospheres. The yield consists of 89% of 4,4'-diamino-3,3'-dimethyldicyclohexylmethane, 3% of (4-amino-3-methylphenyl)-(4' - amino - 3 - methylcyclohexyl)methane, which is recycled, 5% of (4 - amino - 3-methylcyclohexyl) - (3' - methylcyclohexyl)-methane and 2% of a high-boiling residue.

EXAMPLE 2

1,250 g. of coarsely porous spheres of molten aluminum oxide having a diameter of about 6 mm. are sprayed in a coating drum at 300° C. with a composition consisting of 76 g. of cobaltous oxide, 8 g. of sodium carbonate, 18 g. of glyoxal and 100 g. of water. The sprayed spheres are then heated at 550° C. for 3 hours. The catalyst thus obtained contains 5.7% of cobaltous oxide and 0.35% of sodium oxide, by weight.

A tube of 1.5 m. in length and 30 mm. in diameter is filled with this catalyst. 120 g. of molten 4,4'-diaminodiphenylmethane and 2,000 l. of hydrogen (S.T.P.) are fed into the tube at its top end and passed over the catalyst at a temperature of 220° to 260° C. and a pressure of 320 atmospheres. The yield per hour consists of 90% of 4,4'-diaminodicyclohexylmethane, 3% of 4-aminodicyclohexylmethane, 1% of a high-boiling residue and 6% of aminocyclohexylaminophenylmethane, which is recycled.

EXAMPLE 3

390 g. of coarsely porous spheres of aluminum silicate having a diameter of 6 mm. are heated in a coating drum at 300° C. and sprayed with an aqueous solution containing 100 g. of nickel nitrate, at the same temperature. The catalyst is then reduced with hydrogen at 320° C. The support contains 5% of nickel by weight.

Aniline and 200 l./hr. of hydrogen are passed over this catalyst under a pressure of 70 atmospheres and at 220° C., the throughput being 0.1 kg. per liter of catalyst per hour. The product consists of 85% of cyclohexylamine and 15% of dicyclohexylamine.

EXAMPLE 4

390 g. of coarsely porous spheres of aluminum silicate having a diameter of 6 mm. are heated at about 300° C. and sprayed with an aqueous solution containing 200 g. of nickel nitrate, at the same temperature. The catalyst is then reduced with hydrogen at 320° C. The catalyst contains 10% of nickel by weight.

200 l./hr. of hydrogen and phenol are passed over this catalyst at 210° C. and under a pressure of 250 atmospheres, the throughput being 0.1 kg. per liter of catalyst per hour.

Cyclohexanol is obtained in a yield of 98% of theory with a small stream of forerunnings consisting of cyclohexane.

The same results are obtained when using a catalyst made by heating 2,216.5 g. of coarsely porous spheres of aluminum silicate having a diameter of 6 mm. at 300° C. and spraying them in a coating drum with a dilute solution of 40 g. of chloroplatinic acid and then reducing the resulting catalyst with hydrogen. The support contains 0.6% of platinum by weight.

EXAMPLE 5

52 g. of coarsely porous spheres of molten aluminum oxide or magnesium oxide are heated at 300° C. in a coating drum and then sprayed at this temperature with 50 g. of ammonium dodecamolybdate in aqueous solution. The catalyst is then heated at 450° C. for 3 hours. The support contains 10% of $MoO_3$ by weight.

A mixture of 70% crude benzene and 30% cyclohexane is passed, together with 1,200 l./hr. of hydrogen (S.T.P.), over the above catalyst at a pressure of 200 atmospheres and a temperature of 310° C., the throughput being 0.3 kg. per liter of catalyst per hour. A substantially complete conversion to cyclohexane is obtained.

A mixture of hydrogen sulfide and hydrogen may be passed over the sprayed support at 480° C. with conversion of the molybdenum compound to molybdenum sulfide. Similar results are obtained with this catalyst.

EXAMPLE 6

284 g. of coarsely porous spheres of molten alumina having a diameter of 5 mm. are heated in a coating drum at 350° C. and then sprayed at this temperature with an aqueous suspension containing 70.2 g. of cobalt oxide, 22 g. of cobalt nitrate $(Co(NO_3)_2 \cdot 6H_2O)$ and 18 g. of glyoxal, and the cobalt compounds are reduced to cobalt with hydrogen at 370° C.

50 g./hr. of 3-ethoxy propionitrile and 200 l./hr. of hydrogen are passed over 500 cc. of this catalyst under a pressure of 250 atmospheres and at a temperature of 95° C. in the presence of 500 cc. of liquid ammonia. Ammonia acts as a protective gas to prevent the formation of by-products. After removing the ammonia, there is obtained a reaction product consisting of 92% of 3-ethoxypropylamine-1, 6% of di-(3-ethoxypropyl)-imine and 2% of a higher-boiling residue.

EXAMPLE 7

40 g./hr. of aminopropionitrile and 325 g./hr. of liquid ammonia are passed, together with 200 l./hr. of hydrogen, over 500 cc. of the catalyst described in Example 6 at 80° C. and under a pressure of 280 atmospheres. 100% conversion is obtained. The reaction product consists of 83% propylenediamine-1,3, 15% of dipropylene-triamine and 2% of a higher-boiling residue.

EXAMPLE 8

1,250 g. of spheres of molten alumina having a diameter of 6 mm. are heated in a coating drum at 290° C. and are sprayed at this temperature with an aqueous suspension of 419 g. of cobalt oxide and 85 g. of glyoxal. The catalyst is then reduced with hydrogen at 380° C.

An acid-proof tube provided with heating means and having a capacity of 0.8 l. is filled with the above catalyst. At a temperature of 280° C. 8 kg. of a warmed, saturated aqueous adipic acid solution together with 2,000 l. of hydrogen are passed over the catalyst under a pressure of 275 atmospheres. Hexane diol is obtained in a theoretical yield of 96.7%.

We claim:

1. In a process for the production of a diaminodicyclohexylalkane or a diaminodicyclohexylether by hydrogenating in the liquid phase a diaminodiphenylalkane or a diaminodiphenylether in the presence of a supported cobalt or nickel catalyst at a temperature of from 100 to 400° C. and at a pressure of from 20 to 700 atmospheres, the improvement which comprises hydrogenating said diaminodiphenylalkane or said diaminodiphenylether in the presence of a supported catalyst which has been made by spraying a cobalt or nickel-containing solution or suspension onto the support, the later being at a temperature of from 150 to 500° C. during spraying.

2. A process as claimed in claim 1, wherein the temperature of the support during spraying is from 250 to 500° C.

3. A process as claimed in claim 1, wherein the cobalt or nickel-containing solution or suspension contains a basifying alkali metal compound.

4. A process as claimed in claim 1 wherein said support is from the group of natural or synthetic silicates, zeolites, alumina, kieselguhr, pumice, porcelain, quartz, silicon carbide, zinc oxide, magnesium oxide and titanium oxide.

References Cited

UNITED STATES PATENTS

| | | | |
|---|---|---|---|
| 3,513,109 | 5/1970 | Stiles | 252—466 B X |
| 3,498,927 | 3/1970 | Stiles | 252—466 B X |
| 3,379,499 | 4/1968 | Moehl | 252—466 J X |
| 2,949,429 | 8/1960 | Bailey et al. | 252—466 J X |
| 2,846,488 | 8/1968 | Miller | 252—466 B X |

OTHER REFERENCES

Collier, "Catalysts in Practice" (1961), pp. 55–56.

LEWIS GOTTS, Primary Examiner

D. R. PHILLIPS, Assistant Examiner

U.S. Cl. X.R.

252—466 B, 466 I, 466 J, 472, 474

UNITED STATES PATENT OFFICE
CERTIFICATE OF CORRECTION

Patent No. 3,799,983      Dated March 26, 1974

Inventor(s) Hubert Corr and Guenter Poehler

It is certified that error appears in the above-identified patent and that said Letters Patent are hereby corrected as shown below:

Column 1, line 3, "Guenther" should read -- Guenter --.

Column 3, line 6, "temperature" should read -- temperatures --.

Column 6, line 34, "later" should read -- latter --.

Signed and sealed this 22nd day of October 1974.

(SEAL)
Attest:

McCOY M. GIBSON JR.
Attesting Officer

C. MARSHALL DANN
Commissioner of Patents